US010889179B2

(12) United States Patent
Momii et al.

(10) Patent No.: US 10,889,179 B2
(45) Date of Patent: Jan. 12, 2021

(54) SHUTTER GRILL

(71) Applicant: HONDA MOTOR CO., LTD., Tokyo (JP)

(72) Inventors: Motoyuki Momii, Wako (JP); Yasutomo Ueda, Wako (JP); Osamu Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 16/162,446

(22) Filed: Oct. 17, 2018

(65) Prior Publication Data

US 2019/0118643 A1 Apr. 25, 2019

(30) Foreign Application Priority Data

Oct. 19, 2017 (JP) ................................. 2017-202971

(51) Int. Cl.
*B60K 11/08* (2006.01)

(52) U.S. Cl.
CPC ......... *B60K 11/085* (2013.01); *B60Y 2306/01* (2013.01)

(58) Field of Classification Search
CPC . B60K 11/085; B60R 2019/486; B60R 19/52; B60H 1/3421; B60H 2001/3471
USPC ....... 454/155, 152, 286, 284, 309, 313–320; 180/68.1
See application file for complete search history.

(56) References Cited

U.S. PATENT DOCUMENTS

| | | | |
|---|---|---|---|
| 2013/0012115 A1* | 1/2013 | Schwarz | B60K 11/085 454/155 |
| 2013/0126253 A1 | 5/2013 | Saito et al. | |
| 2016/0368367 A1* | 12/2016 | Schoning | B60K 11/085 |

FOREIGN PATENT DOCUMENTS

| | | |
|---|---|---|
| JP | 2013-107534 A | 6/2013 |
| JP | 2013-203316 A | 10/2013 |

OTHER PUBLICATIONS

Japanese Office Action dated Apr. 2, 2019, 3 pages.

\* cited by examiner

*Primary Examiner* — Vivek K Shirsat
(74) *Attorney, Agent, or Firm* — Rankin, Hill & Clark LLP

(57) ABSTRACT

A shutter grill is provided for an air-intake opening formed on an outer surface of a vehicle and includes: a frame that has an opening portion and is fixed to a member forming the outer surface; and a fin capable of opening and closing the opening portion inside the frame. The frame includes an upper-lower displacement portion that allows the frame to be displaced in an upper-lower direction at the time of a vehicle collision.

2 Claims, 9 Drawing Sheets

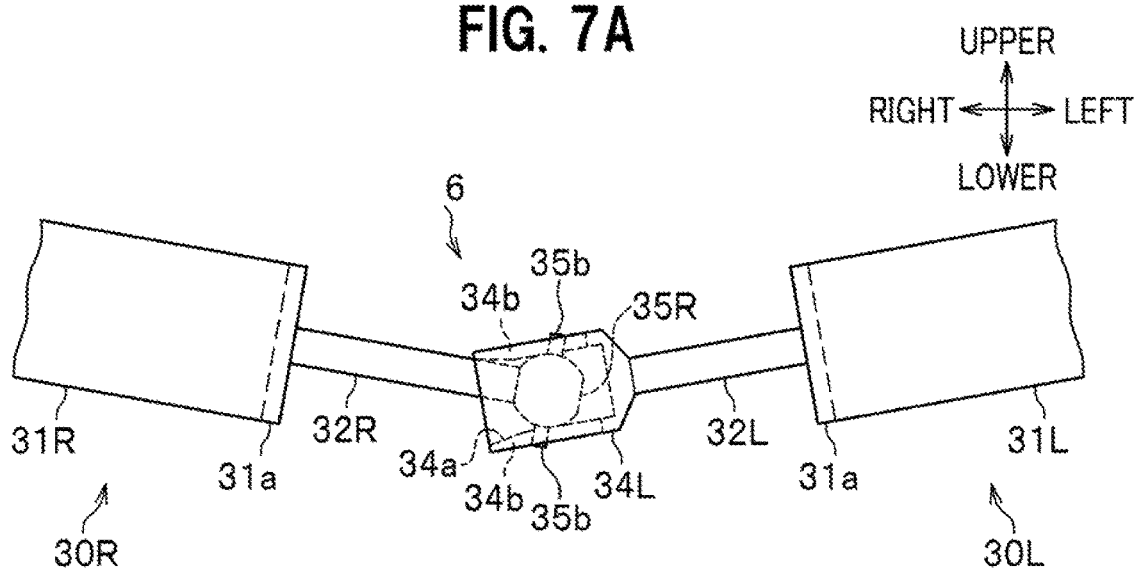
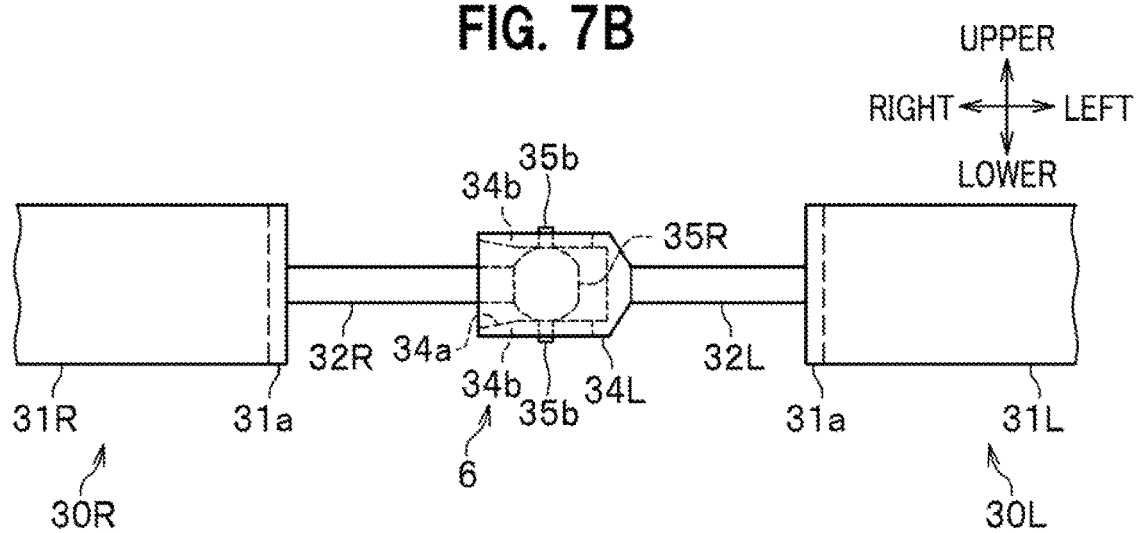
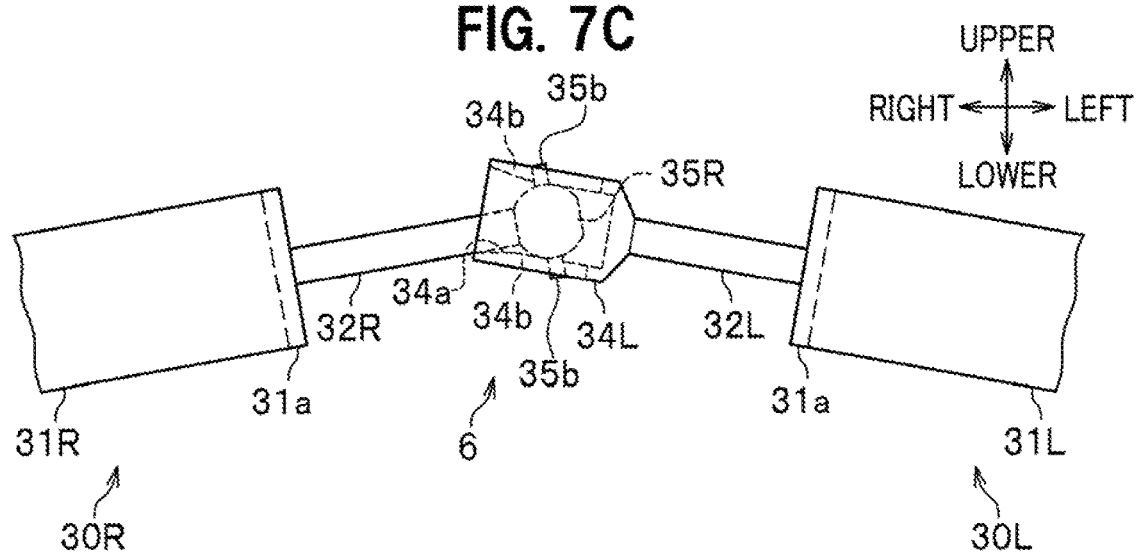

SHUTTER GRILL

BACKGROUND OF THE INVENTION

1. Field of the Invention

The present invention relates to a shutter grill for a vehicle.

2. Description of the Related Art

Patent Literature 1 describes providing protruding portions on the front surface of a frame of a shutter grill, and at the time of a collision, moving a front grill rearward by receiving a load via the protruding portions and rotating the shutter grill about a fulcrum being fixation portions at the left and right parts of the frame.

PRIOR ART DOCUMENT(S)

Patent Literature(s)

Patent Literature 1: JP 2013-107534 A1

Depending on the type of a collision and an object involved in the collision, a load occurs also in an upper-lower direction of the vehicle, and the shutter grill needs to be displaced in response to the load in the upper-lower direction. However, conventional shutter grills cannot make such displacement possible.

SUMMARY OF THE INVENTION

The present invention has been made in view of the above point and has an object to provide a shutter grill capable of favorably being displaced at the time of a collision by following displacement of a member forming an outer surface.

To solve the above problem, a shutter grill of the present invention is a shutter grill provided for an air-intake opening formed on an outer surface of a vehicle and comprises: a frame that has an opening portion and is fixed to a member forming the outer surface; and a fin capable of opening and closing the opening portion inside the frame. The frame includes an upper-lower displacement portion that allows the frame to be displaced in an upper-lower direction at a time of a vehicle collision.

The present invention can provide a shutter grill capable of being favorably displaced at the time of a collision by following displacement of a member forming an outer surface.

BRIEF DESCRIPTION OF THE DRAWINGS

FIG. 7A is a front view showing how the fin joint portion allows upper-lower displacement of the left fin and the right fin;

FIG. 7B is a front view showing how the fin joint portion allows upper-lower displacement of the left fin and the right fin;

FIG. 7C is a front view showing how the fin joint portion allows upper-lower displacement of the left fin and the right fin;

DETAILED DESCRIPTION OF THE EMBODIMENTS

Figure 1:
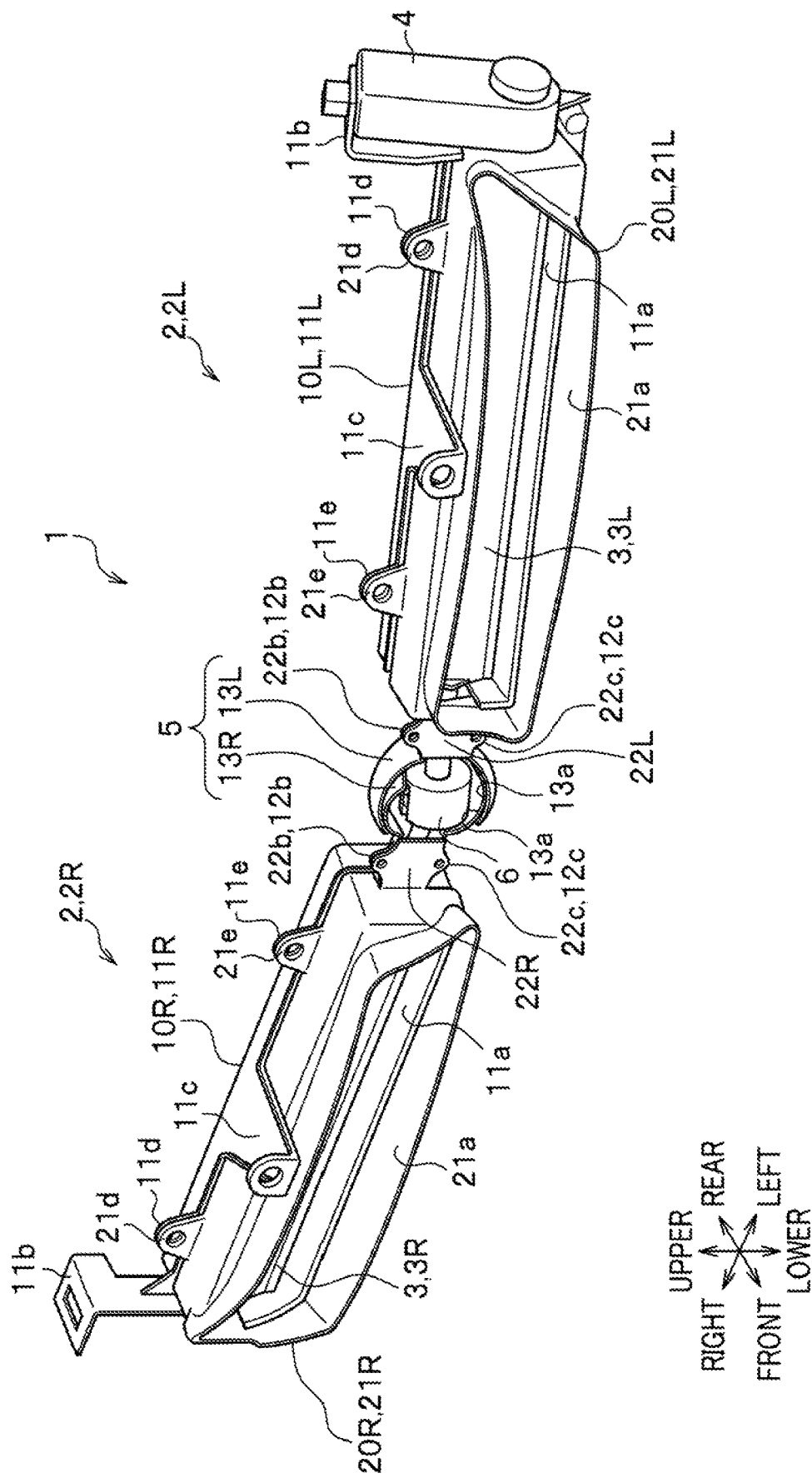
FIG. 1 is a schematic perspective view of a shutter grill according to an embodiment of the present invention.

An embodiment of the present invention will be hereinafter described in detail with reference to the drawings where necessary. Note that the directions indicated by the arrows in the drawings are defined as follows. "Front" and "rear" are based on the front-rear direction of the vehicle, and "left" and "right" are based on the left-right direction (the vehicle width direction) as seen from the driver's seat.

Figure 2:
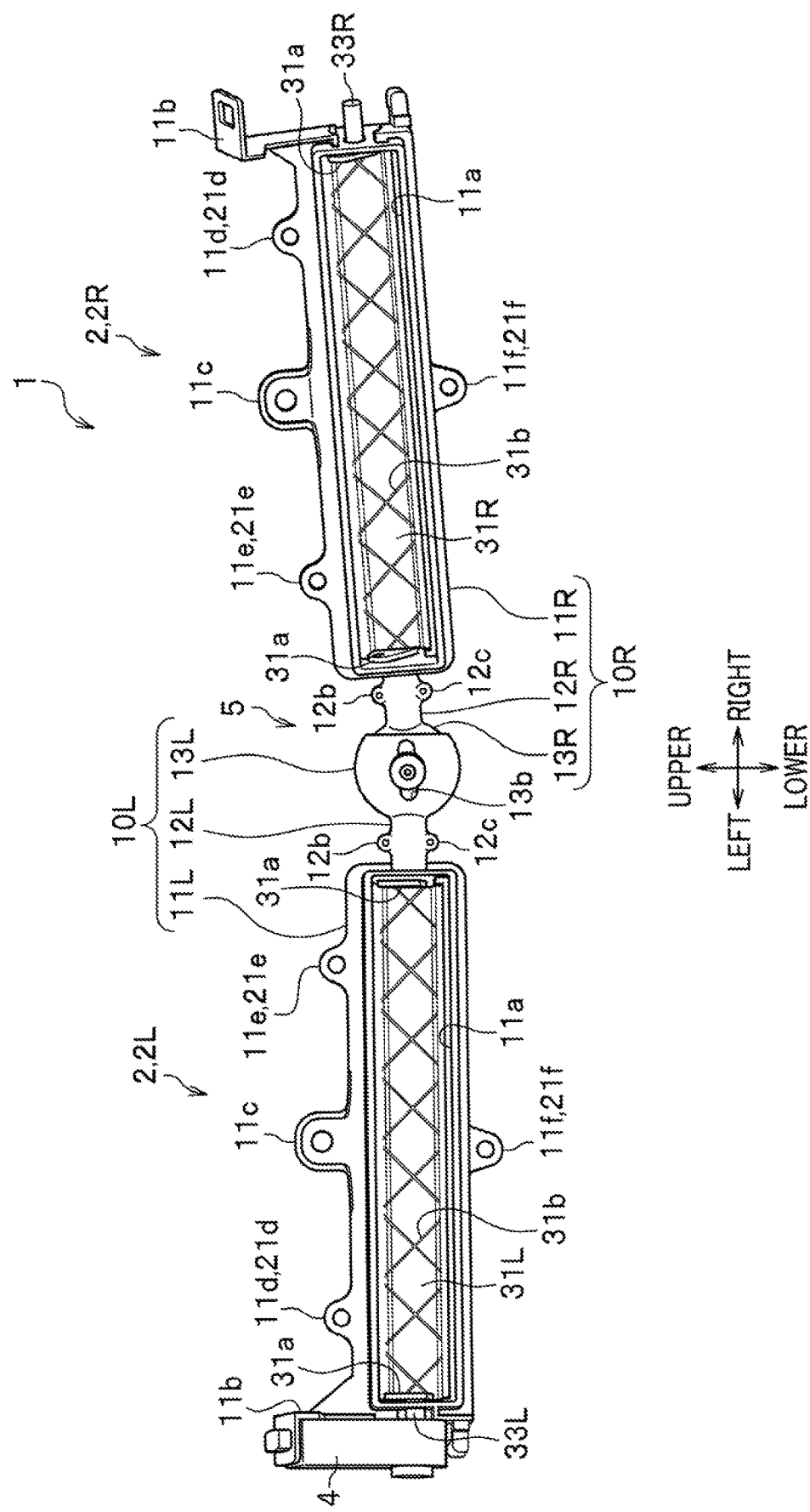
FIG. 2 is a schematic back view of the shutter grill according to the embodiment of the present invention.

As shown in FIGS. 1 and 2, a shutter grill 1 according to the embodiment of the present invention is a shutter mechanism for opening and closing air-intake openings 51 (see FIG. 4) formed on a grill 50 of the vehicle, and includes a frame 2, a fin 3, and a motor 4 for turning the fin 3.

<Frame>

The frame 2 is a frame body having openings that communicate with the air-intake openings (see FIG. 4), and has a left frame 2L, a right frame 2R, and an upper-lower displacement portion 5.

<Left Frame>

The left frame 2L is formed by a combination of a left frame rear part 10L and a left frame front part 20L.

<Left Frame Rear Part>

The left frame rear part 10L is a resinous member forming a rear part of the left frame 2L and part of the upper-lower displacement portion 5, and integrally includes a frame portion 11L, a groove portion 12L, and a semispherical portion 13L.

«Frame Portion»

The frame portion 11L has a rectangular frame shape which is laterally long in a front view. In other words, the frame portion 11L has an opening portion 11a which is rectangular in a front view. The frame portion 11L also has flange portions 11b, 11c, 11d, 11e, and 11f.

The flange portion 11b extends upward from a left wall portion of the frame portion 11L. The flange portion 11b has such a structure as to allow the motor 4 to be attached thereto. Note that the flange portion 11b may be omitted at one of the frame portions 11L, 11R to which the motor 4 is not attached.

The flange portion 11c extends forward from a middle portion (in the vehicle width direction) of an upper wall portion of the frame portion 11L. The flange portion 11c extends forward beyond the left frame front part 20L, with its front end portion bending upward. The flange portion 11c is fixed to the back surface of the grill 50 of the vehicle (see FIGS. 3 and 4). Note that the flange portion 11c may alternatively extend forward from a middle portion (in the vehicle width direction) of a lower wall portion of the frame portion 11L.

The flange portions 11d, 11e extend upward from the upper wall portion of the frame portion 11L, at positions sandwiching the flange portion 11c. The flange portion 11f extends downward from a middle portion (in the vehicle width direction) of a lower wall portion of the frame portion 11L. The flange portions 11d to 11f are portions used to attach the left frame rear part 10L and the left frame front part 20L to each other.

«Groove Portion»

The groove portion 12L extends rightward from a right wall portion of the frame portion 11L. The groove portion 12L allows the inside space of the frame portion 11L to communicate with the inside space of the semispherical portion 13L. The front side of the groove portion 12L is open. In other words, an opening portion 12a (see FIGS. 6A to 6C) is formed on the front side of the groove portion 12L. The groove portion 12L has flange portions 12b, 12c.

The flange portion 12b extends upward from a front end portion of an upper wall portion of the groove portion 12L. The flange portion 12c extends downward from a front end portion of a lower wall portion of the groove portion 12L. The flange portions 12b, 12c are portions used to attach the left frame rear part 10L and the left frame front part 20L to each other.

«Semispherical Portion»

Figure 6A:
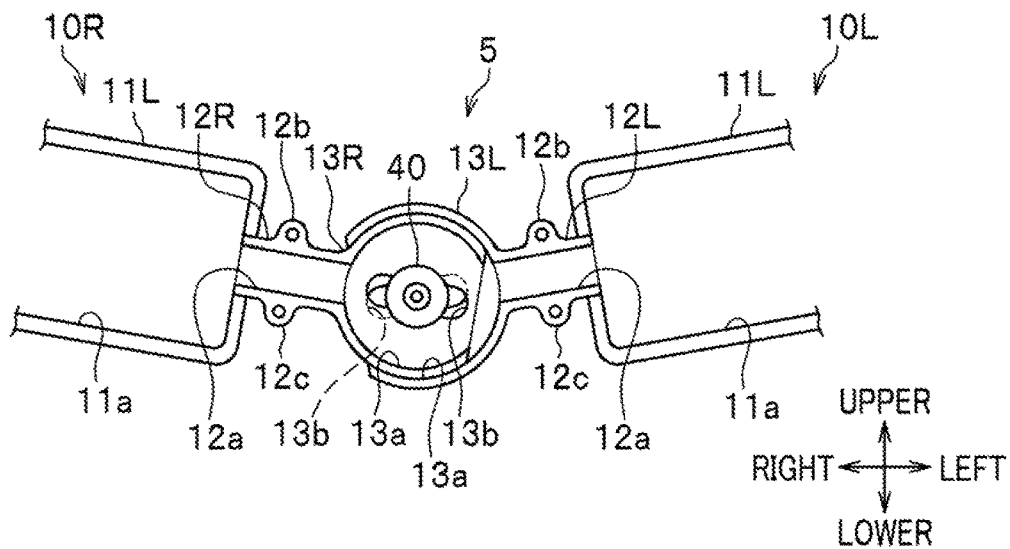
FIG. 6A is a front view showing how the upper-lower displacement portion allows upper-lower displacement of a left frame rear part and a right frame rear part.
Figure 6B:
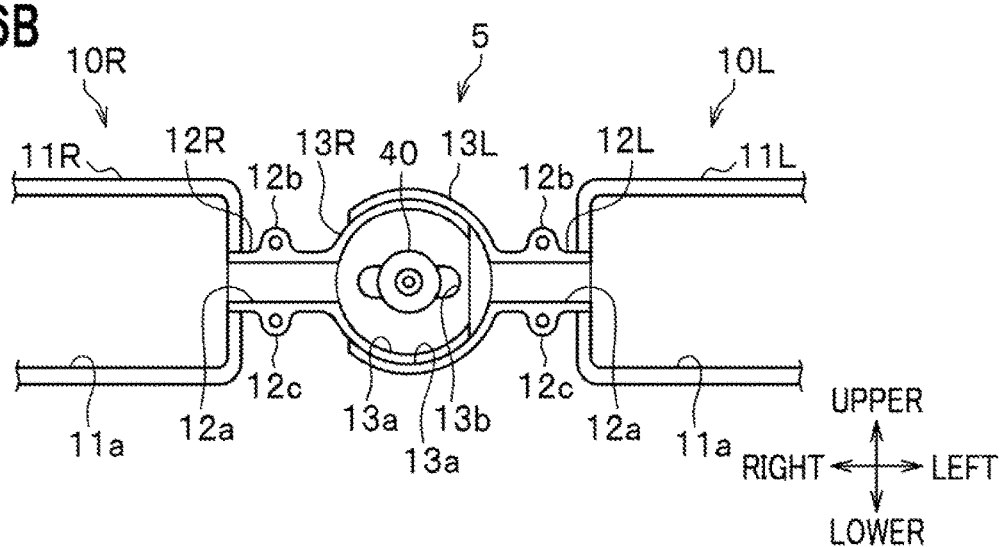
FIG. 6B is a front view showing how the upper-lower displacement portion allows upper-lower displacement of the left frame rear part and the right frame rear part.
Figure 6C:
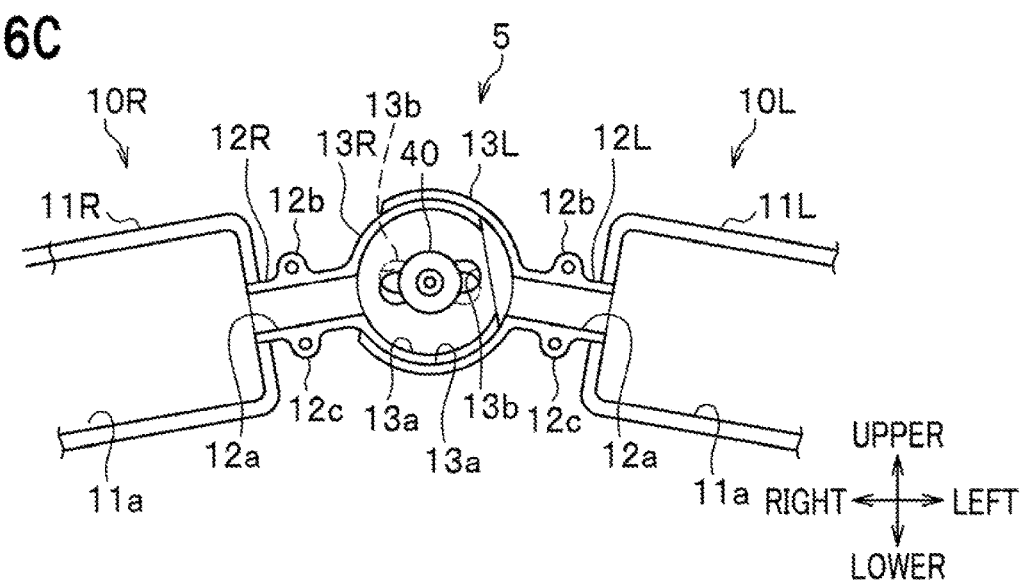
FIG. 6C is a front view showing how the upper-lower displacement portion allows upper-lower displacement of the left frame rear part and the right frame rear part.

The semispherical portion 13L is provided at a right end portion of the groove portion 12L. The semispherical portion 13L is hollow and is open at the front side. In other words, an opening portion 13a is formed on the front side of the semispherical portion 13L. In addition, as shown in FIGS. 6A to 6C, a hole portion 13b is formed on the semispherical portion 13L. The hole portion 13b is formed on a rear end portion (a middle portion in the height direction) of the semispherical portion 13L and is laterally long.

<Left Frame Front Part>

As shown in FIGS. 1 and 2, the left frame front part 20L is a resinous member forming a front part of the left frame 2L, and integrally includes a frame portion 21L and a lid portion 22L.

«Frame Portion»

The frame portion 21L has a rectangular frame shape which is laterally long in a front view. In other words, the frame portion 21L has an opening portion 21a which is rectangular in a front view. A rear end portion of the frame portion 21L is fitted around a front end portion of the frame portion 11L. The frame portion 21L also functions as a duct upstream of the fin 3. Further, the frame portion 21L has flanges 21d, 21e, 21f.

The flanges 21d, 21e extend upward from a rear end portion of an upper wall portion of the frame portion 21L, at positions sandwiching the flange portion 11c. The flange portion 21f extends downward from a rear end portion of a middle portion (in the vehicle width direction) of a lower wall portion of the frame portion 21L. The flanges 21d to 21f are portions used to attach the left frame rear part 10L and the left frame front part 20L to each other.

«Lid Portion»

The lid portion 22L extends rightward from a right wall portion of the frame portion 21L. The lid portion 22L has a shape that can cover the opening portion 12a of the groove portion 12L. The lid portion 22L has flange portions 22b, 22c.

The flange portion 22b extends upward from an upper end portion of the lid portion 22L. The flange portion 22c extends downward from a lower end portion of the lid portion 22L. The flange portions 22b, 22c are portions used to attach the left frame rear part 10L and the left frame front part 20L to each other.

<Attachment of the Left Frame Rear Portion and the Left Frame Front Part>

The flange portion 11d of the left frame rear part 10L and the flange portion 21d of the left frame front part 20L are aligned and fixed to each other with a pin or the like. The flange portion 11e of the left frame rear part 10L and the flange portion 21e of the left frame front part 20L are aligned and fixed to each other with a pin or the like. The flange portion 11f of the left frame rear part 10L and the flange portion 21f of the left frame front part 20L are aligned and fixed to each other with a pin or the like.

Moreover, the flange portion 12b of the left frame rear part 10L and the flange portion 22b of the left frame front part 20L are aligned and fixed to each other with a pin or the like. The flange portion 12c of the left frame rear part 10L and the flange portion 22c of the left frame front part 20L are aligned and fixed to each other with a pin or the like.

<Right Frame>

The right frame 2R is formed by a combination of a right frame rear part 10R and a right frame front part 20R.

<Right Frame Rear Part>

The right frame rear part 10R is a resinous member forming a rear part of the right frame 2R and part of the upper-lower displacement portion 5, and integrally includes a frame portion 11R, a groove portion 12R, and a semispherical portion 13R. Symmetrically, the frame portion 11R and the groove portion 12R have the same structures as the frame portion 11L and the groove portion 12L of the left frame rear part 10L, and are therefore not described here. In addition, symmetrically, the semispherical portion 13R has the same structure as the semispherical portion 13L of the left frame rear part 10L except for its size, and is therefore not described here.

<Right Frame Front Part>

The right frame front part 20R is a resinous member forming a front part of the right frame 2R, and integrally includes a frame portion 21R and a lid portion 22R. Symmetrically, the frame portion 21R and the lid portion 22R have the same structures as the frame portion 21L and the lid portion 22L of the left frame front part 20L, and are therefore not described here.

<Upper-Lower Displacement Portion (Frame Upper-Lower Displacement Portion), Frame Joint Portion, and Spherical Joint>

Figure 3:
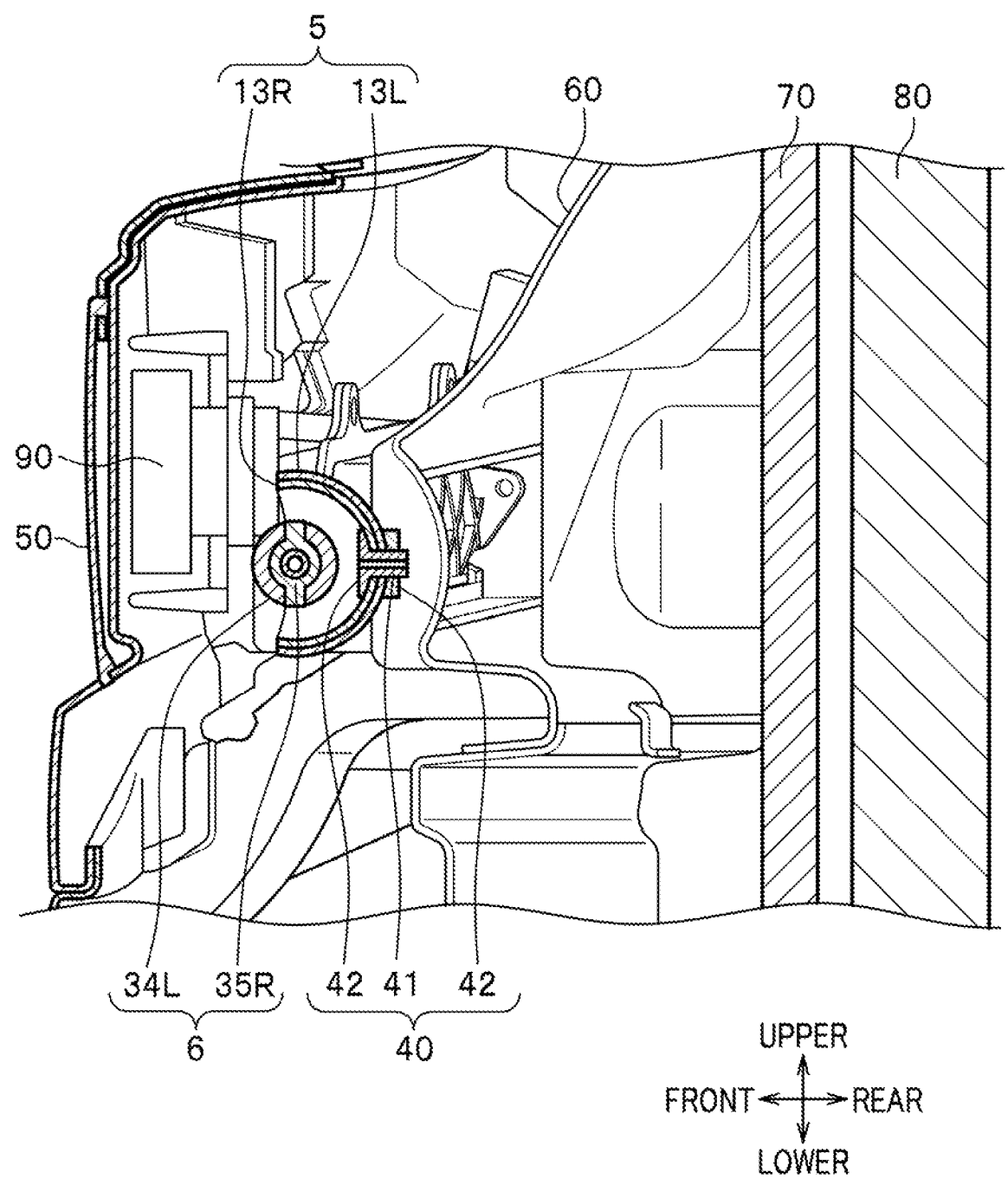
FIG. 3 is a schematic sectional view of a vehicle having the shutter grill according to the embodiment of the present invention, the sectional view taken at the positions of an upper-lower displacement portion and a fin joint portion.

The upper-lower displacement portion (frame upper-lower displacement portion) 5 includes the semispherical portion 13L of the left frame rear part 10L, the semispherical portion 13R of the right frame rear part 10R, and a link portion 40 (see FIG. 3). In the present embodiment, the inside diameter of the semispherical portion 13L and the outside diameter of the semispherical portion 13R are substantially equal, and the semispherical portion 13R is fitted inside the semispherical portion 13L.

<Link Portion>

As shown in FIG. 3, the link portion 40 is a resinous member which is inserted into the hole portion 13b of the semispherical portion 13L and the hole portion 13b of the semispherical portion 13R and sandwiches the semispherical portion 13L and the semispherical portion 13R. The link portion 40 integrally includes a shaft portion 41 and paired press portions 42, 42. The shaft portion 41 is a solid-cylindrical portion inserted into the hole portion 13b of the semispherical portion 13L and the hole portion 13b of the semispherical portion 13R. The outside diameter of the shaft portion 41 is substantially equal to the width of the hole portion 13b in the short diameter direction. The press portions 42, 42 are circular plate portions provided at the respective end portions of the shaft portion 41. The outside diameter of the press portions 42, 42 is larger than the width of the hole portion 13b in the short diameter direction.

Since the shaft portion 41 can move relatively inside the hole portion 13b in the left-right direction (in the vehicle width direction), the link portion 40 allows the semispherical portion 13L and the semispherical portion 13R to turn relatively about a front-rear axis, i.e., to be displaced in the upper-lower direction. Since the shaft portion 41 can turn relatively inside the hole portion 13b, the link portion 40 allows the semispherical portion 13L and the semispherical portion 13R to turn relatively about an upper-lower axis, i.e., to be displaced in the front-rear direction. Since the shaft portion 41 cannot move relatively inside the hole portion 13b in a direction orthogonal to the vehicle width direction, the link portion 40 restricts relative turning of the semispherical portion 13L and the semispherical portion 13R about a left-right axis.

Thus, the upper-lower displacement portion 5 allows the frame 2 to be displaced in the upper-lower direction in response to an external load. Further, in response to an external load, the upper-lower displacement portion 5 allows the frame 2 to be displaced in the front-rear direction, and turns the left frame 2L and the right frame 2R together about the left-right axis.

As thus described, the upper-lower displacement portion 5 is a frame joint part that connects the left frame 2L and the right frame 2R. Also, the upper-lower displacement portion 5 is a spherical joint formed by the semispherical portions 13L, 13R. A detailed description will be given later as to how the upper-lower displacement portion 5 allows displacement of the frame 2.

<Fin>

As shown in FIGS. 1 and 2, the fin 3 is a plate body that opens and closes the opening portions of the frame 2 as driven by the motor 4, and includes a left fin 3L, a right fin 3R, and a fin joint part 6.

<Left Fin>

The left fin 3L is formed by a left fin member 30L.

<Left Fin Member>

The left fin member 30L is a resinous member forming the left fin 3L and part of the fin joint part 6, and integrally includes a fin 31L, a shaft portion 32L, a shaft portion 33L, and a hollow-cylindrical portion 34L.

«Fin»

The fin 31L is a plate-shaped part which is laterally long. The fin 31L is housed in the opening portions 11a, 21a of the left frame rear part 10L and the left frame front part 20L. The fin 31L has stoppers 31a and ribs 31b.

The stoppers 31a extend rearward from the respective end portions of the fin 31L in the vehicle width direction. The ribs 31b are reinforcement parts formed on the rear surface of the fin 31L.

«Shaft Portion»

The shaft portion 32L is a solid-cylindrical portion extending rightward from a right end portion of the fin 31L (or the stopper 31a at the right end portion to be exact). The shaft portion 32L is housed in the groove portion 12L and the semispherical portion 13L of the left frame rear part 10L and the semispherical portion 13R.

«Shaft Portion»

The shaft portion 33L is a solid-cylindrical part extending leftward from a left end portion of the fin 31L (or the stopper 31a at the left end portion to be exact). The shaft portion 33L is coaxial with the shaft portion 32L, and is connected to the motor 4 attached to the flange portion 11b of the left frame rear part 10L, via a hole portion, a notch portion, or the like formed on the left frame rear part 10L and/or the left frame front part 20L.

«Hollow-Cylindrical Portion»

As shown in FIGS. 7A to 7C, the hollow-cylindrical portion 34L is provided to a right end portion of the shaft portion 32L. The hollow-cylindrical portion 34L has a bottom wall portion at a left end portion thereof and has an opening portion 34a at a right end portion thereof. The hollow-cylindrical portion 34L is housed in the semispherical portions 13L, 13R. The hollow-cylindrical portion 34L has paired groove hole portions 34b, 34b (see FIGS. 9A to 9C).

Figure 9A:
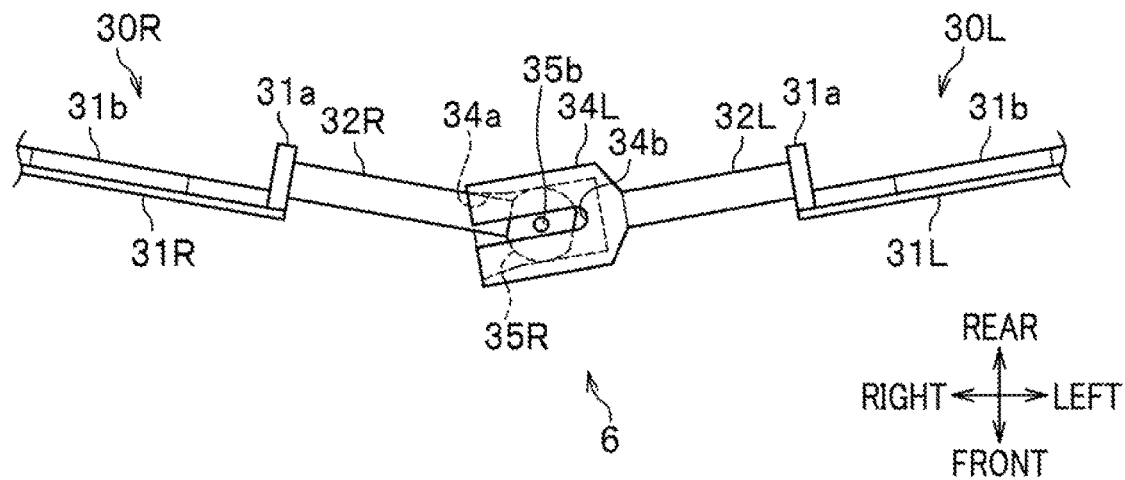
FIG. 9A is a plan view showing how the fin joint portion allows forward-rearward displacement of the left fin and the right fin.
Figure 9B:
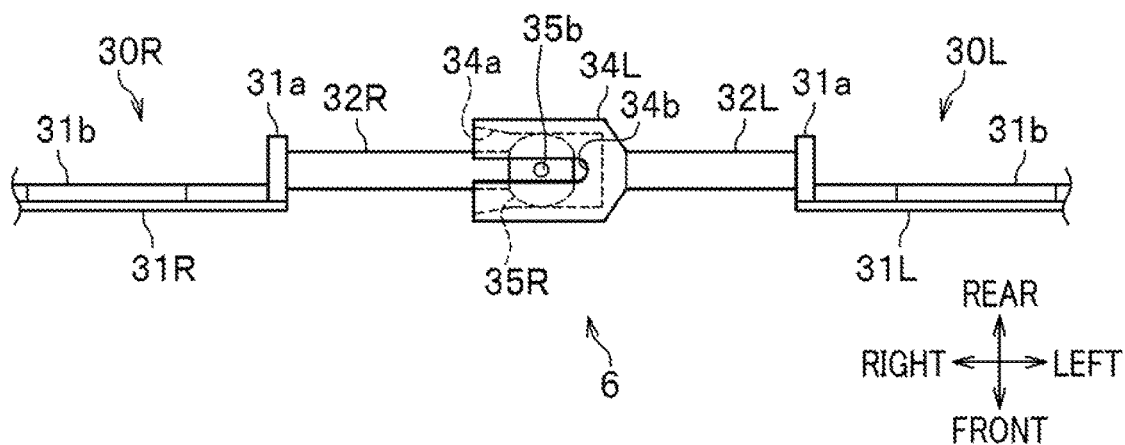
FIG. 9B is a plan view showing how the fin joint portion allows forward-rearward displacement of the left fin and the right fin.
Figure 9C:
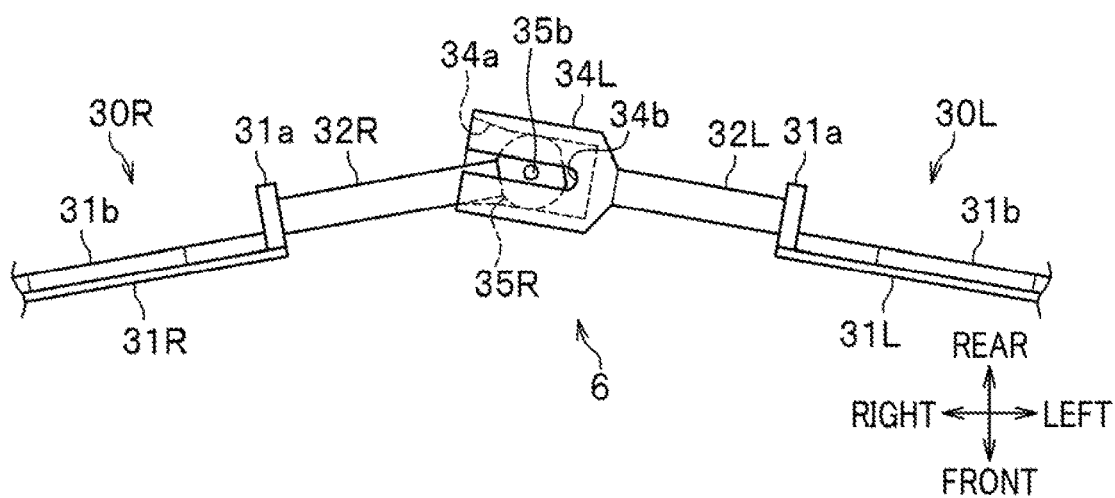
FIG. 9C is a plan view showing how the fin joint portion allows forward-rearward displacement of the left fin and the right fin.

As shown in FIGS. 9a to 9C, the groove hole portions 34b are formed on a circumferential wall portion of the hollow-cylindrical portion 34L and extend rightward from the side where the opening portion 34a is formed. The groove hole portions 34b are formed up to positions close to the bottom portion of the hollow-cylindrical portion 34L beyond the middle of the circumferential wall portion of the hollow-cylindrical portion 34L in the height direction thereof. The paired groove hole portions 34b are disposed at opposing positions on the circumferential wall portion of the hollow-cylindrical portion 34L.

<Right Fin>

As shown in FIGS. 1 and 2, the right fin 3R is formed by a right fin member 30R.

<Right Fin Member>

The right fin member 30R is a resinous member forming the right fin 3R and part of the fin joint part 6, and integrally includes a fin 31R, a shaft portion 32R, a shaft portion 33R, and a spherical portion 35R. Symmetrically, the fin 31R, the shaft portion 32R, and the shaft portion 33R have the same structures as the fin 31L, the shaft portion 32L, and the shaft portion 33R of the left fin member 30L, and are therefore not described here. Note that the shaft portion 33R is not connected to the motor 4.

«Spherical Portion»

As shown in FIGS. 7A to 7c, the spherical portion 35R is provided to a left end portion of the shaft portion 32R. The spherical portion 35R has paired protruding portions 35b, 35b.

The paired protruding portions 35b are solid-cylindrical portions formed at opposing positions on the outer circumferential surface of the spherical portion 35R.

<Fin Joint Part>

The fin joint part 6 includes the hollow-cylindrical portion 34L of the left fin member 30L and the spherical portion 35R of the right fin member 30R. In the present embodiment, the inside diameter of the hollow-cylindrical portion 34L and the outside diameter of the spherical portion 35R are substantially equal, and the spherical portion 35R is housed in the hollow-cylindrical portion 34L. Further, the outside diameter of the protruding portions 35b and the groove width of the groove hole portions 34b are substantially equal, and the protruding portions 35b are slidably inserted in the groove hole portions 34b. Further, the protrusion height of the protruding portions 35b is larger than the thickness of the circumferential wall portion of the hollow-cylindrical portion 34L. The fin joint part 6 is an example of a fin upper-lower displacement portion that allows the fin 3 to be displaced in the upper-lower direction at the time of a vehicle collision.

The protruding portions 35b can move (in a tilted manner) relatively inside the groove hole portions 34b in the left-right direction (the vehicle width direction), and thus allow the hollow-cylindrical portion 34L and the spherical portion 35R to turn relatively about a front-and-rear axis, i.e., to be displaced in the upper-lower direction. The protruding portions 35b can turn relatively inside the groove hole portions 34b, and thus allow the hollow-cylindrical portion 34L and the spherical portion 35R to turn relatively about an upper-lower axis, i.e., to be displaced in the front-rear direction. The protruding portions 35b cannot move relatively inside the groove hole portions 34b in a direction orthogonal to the vehicle width direction, and thus restrict relative turning of the hollow-cylindrical portion 34L and the spherical portion 35R about a left-right axis.

In other words, in response to an external load, the fin joint part 6 allows the fin 3 to be displaced in the upper-lower direction by following displacement of the frame 2 in the upper-lower direction. Further, in response to an external load, the fin joint part 6 allows the fin 3 to be displaced in the front-rear direction by following displacement of the frame 2 in the front-rear direction. Furthermore, in response to an external load, the fin joint part 6 turns the left fin 3L and the right fin 3R together about the left-right axis by following turning of the frame 2 about the left-right axis. A detailed description will be given later as to how the fin joint part 6 allows displacement of the fin 3.

<Disposition and Structure of the Shutter Grill>

Figure 4:
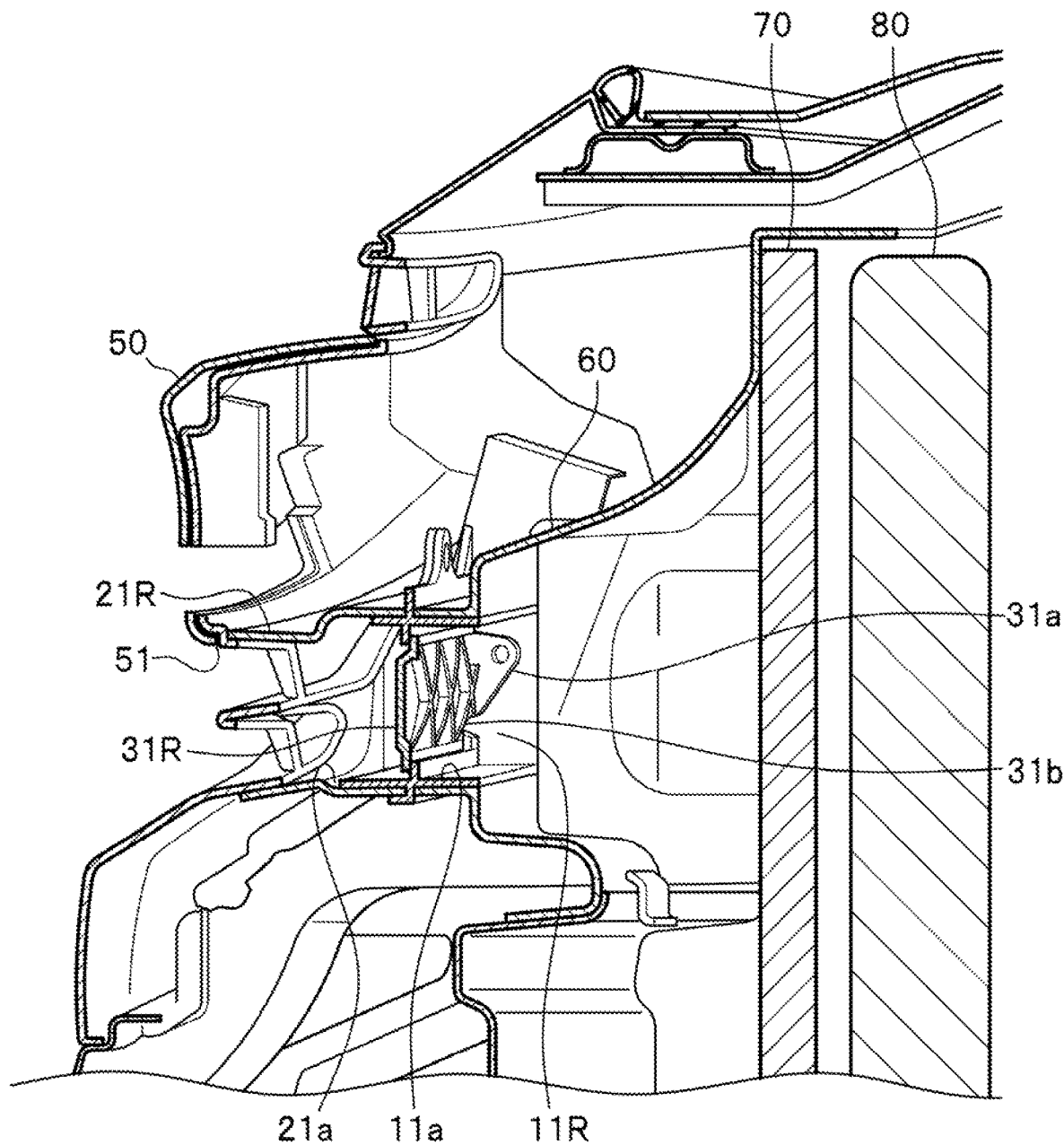
FIG. 4 is a schematic sectional view of the vehicle having the shutter grill according to the embodiment of the present invention, the sectional view taken at the positions of a right frame and a right fin.

As shown in FIGS. 3 and 4, the shutter grill 1 is provided behind the grill 50. In a power house, from front to rear, a duct 60, a condenser 70, and a radiator 80 are provided behind the shutter grill 1. Note that in the power house, an engine and the like are provided behind the radiator 80 as a power source of the vehicle.

<Grill>

The grill 50 is a metallic or resinous member forming an outer surface (a front surface here) of the vehicle. The grill 50 has the air-intake openings 51 for letting air enter the power house formed behind the grill 50. Behind the air-intake openings 51, the frame portions 21L, 21R of the frame front parts 20L, 20R of the shutter grill 1 are provided. In the present embodiment, at least an upper edge portion and a lower edge portion of a peripheral edge portion of each air-intake opening 51 of the grill 50 bend rearward, and the frame portion 21L, 21R of the frame front part 20L, 20R is fitted around the bent portion surrounding the air-intake opening 51.

<Duct>

The duct 60 is a metallic or resinous, tubular member provided behind the frame portions 11L, 11R of the frame rear parts 10L, 10R of the shutter grill 1. The duct 60 has a shape such that the section thereof increases rearward and feeds air passing through the air-intake openings 51 and the shutter grill 1 in the open state into the condenser 70 and the radiator 80.

<Condenser>

The condenser 70 is a component through which a refrigerant (e.g., gas) for a vehicle air conditioner circulates and flows. The refrigerant flowing in the condenser 70 is cooled by the air fed in via the air-intake openings 51, the shutter grill 1 in the open state, and the duct 60, and is supplied to the compressor in the air conditioner.

<Radiator>

The radiator 80 is a component through which a coolant (e.g. water) for the vehicle engine circulates and flows. The coolant flowing in the radiator 80 is cooled by the air fed in via the air-intake opening 51, the shutter grill 1 in the open state, and the duct 60, and is supplied to the engine.

As thus described, the shutter grill 1 is provided at the upstream end portion of the duct 60, and therefore can achieve reduction in the size in the height direction and in the number of the fins 3. Further, the shutter grill 1 can reduce the size of the ducts (the frame front parts 20L, 20R) upstream of the fin 3 on which dynamic pressures acts and thereby decrease leakage of air let in from the air-intake openings 51.

<Opening and Closing Actions of the Shutter Grill>

Figure 5A:
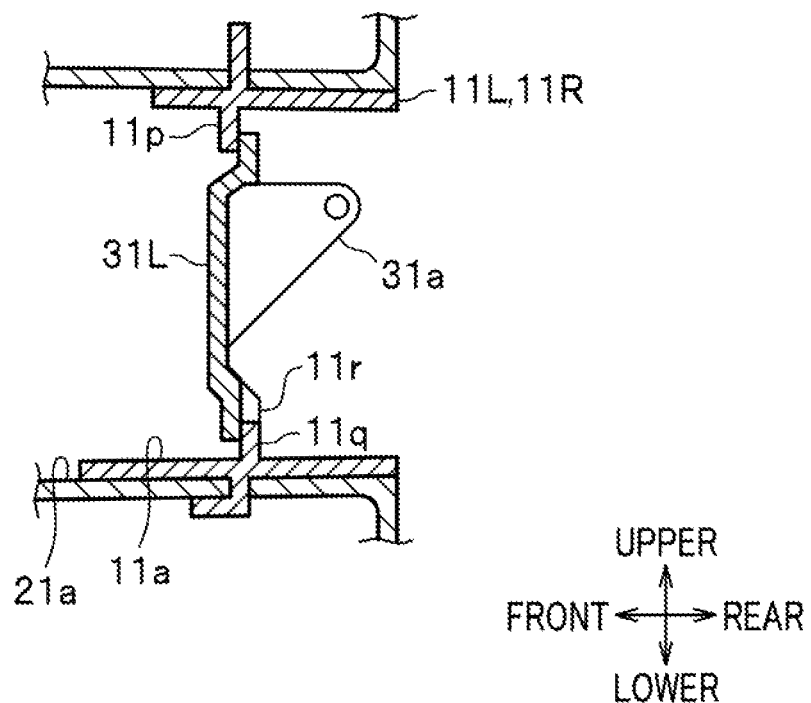
FIG. 5A is a schematic sectional view showing an example of how the shutter grill according to the embodiment of the present invention operates, the view showing a closed state.
Figure 5B:
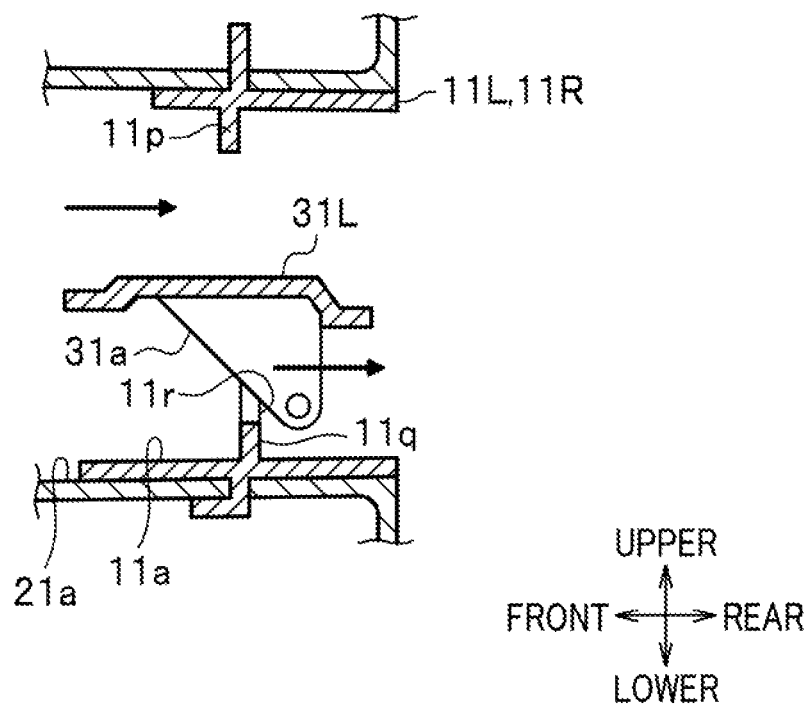
FIG. 5B is a schematic sectional view showing an example of how the shutter grill according to the embodiment of the present invention operates, the view showing an open state.

As shown in FIGS. 5A and 5B, the frame portions 11L, 11R each have stoppers 11p, 11q, 11r. The stopper 11p extends downward from an upper wall portion of the frame portion 11L, 11R. The stopper 11q extends upward from a lower wall portion of the frame portion 11L, 11R. The stopper 11r extends upward from each of the respective end portions (in the vehicle width direction) of a lower wall portion of the frame portion 11L, 11R.

In the closed state shown in FIG. 5A, an upper end portion of the fin 31 is in contact with the rear surface of the stopper 11p, and thereby forward rotation is restricted. A lower end portion of the fin 31 is in contact with the front surface of the stopper 11q, and thereby rearward rotation is restricted. In the closed state, the shutter grill 1 blocks flowing-in of air into the power house through the air-intake openings 51 of the grill 50.

In the open state shown in FIG. 5B, the stopper 31a of the fin 31 is in contact with the upper surface of the stopper 11r, and thereby forward rotation is restricted. In the open state, the shutter grill 1, using the fins 31L, 31R, allows air to enter the powerhouse through the air-intake openings 51 of the grill 50. The air flowing into the power house through the shutter grill 1 flows to the condenser 70 and the radiator 80 through the duct 60, cooling the condenser 70 and the radiator 80.

The fin 31L of the left fin member 30L and the fin 31R of the right fin member 30R are connected by the fin joint part 6 so as to turn together about the left-right axis.

Thus, the fins 31L, 31R are turned by the motor 4 between the closed state shown in FIG. 5A and the open state shown in FIG. 5B.

Further, as shown in FIG. 3, the semispherical portions 13L, 13R have the opening portions 13a at their front, and therefore there is space in front of (or between the grill 50 and) the semispherical portions 13L, 13R. In this space, for example, a sensor (such as a radar) 90 may be installed.

<Displacement of the Shutter Grill>

When the vehicle experiences a frontal collision, the grill 50 is deformed by a frontal collision load, and in response to input of the frontal collision load (deformation) from the left and right paired flange portions 11c, 11c fixed to the grill 50, the shutter grill 1 deforms at the upper-lower displacement portion 5 and the fin joint part 6 by following the deformation of the grill 50.

<Allowance of Displacement of the Frame in the Upper-Lower Direction>

As shown in FIGS. 6A to 6C, using the link portion 40 as a front-and-rear axis, the semispherical portion 13L and the semispherical portion 13R can turn about the front-and-rear axis at the upper-lower displacement portion 5.

Specifically, the frame 2 can bend and deform using the upper-lower displacement portion 5 as a point of bend, with the frame portion 11L and the frame portion 11R moving relatively upward and the upper-lower displacement portion 5 moving relatively downward (from FIG. 6B to FIG. 6A).

Also, the frame 2 can bend and deform using the upper-lower displacement portion 5 as a point of bend, with the frame portion 11L and the frame portion 11R moving relatively downward and the upper-lower displacement portion 5 moving relatively upward (from FIG. 6B to FIG. 6C).

Note that the frame 2 can also bend and deform with one of the frame portions 11L, 11R moving relatively upward or downward.

<Allowance of Displacement of the Fin in the Upper-Lower Direction>

As shown in FIGS. 7A to 7C, the hollow-cylindrical portion 34L and the spherical portion 35R can turn about the front-and-rear axis at the fin joint part 6.

Specifically, the fin 3 can bend and deform using the fin joint part 6 as a point of bend, with the fin 31L and the fin 31R moving relatively upward and the fin joint part 6 moving relatively downward (from FIG. 7B to FIG. 7A).

Also, the fin 3 can bend and deform using the fin joint part 6 as a point of bend, with the fin 31L and the fin 31R moving relatively downward and the fin joint part 6 moving relatively upward (from FIG. 7B to FIG. 7C).

Note that the fin 3 can also bend and deform with one of the fins 31L, 31R moving relatively upward or downward.

<Allowance of Displacement of the Frame in the Front-Rear Direction>

Figure 8A:
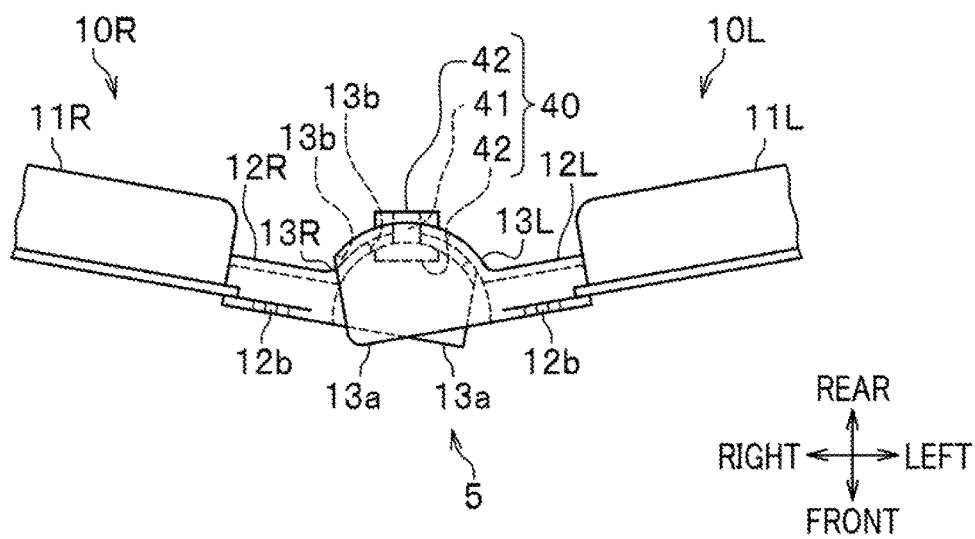
FIG. 8A is a plan view showing how the upper-lower displacement portion allows forward-rearward displacement of the left frame rear part and the right frame rear part.
Figure 8B:
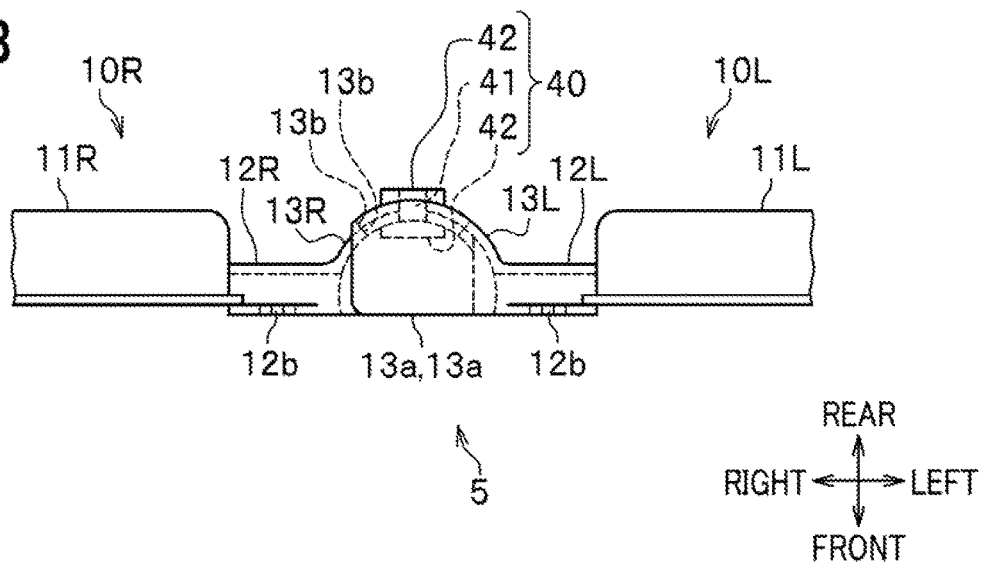
FIG. 8B is a plan view showing how the upper-lower displacement portion allows forward-rearward displacement of the left frame rear part and the right frame rear part.
Figure 8C:
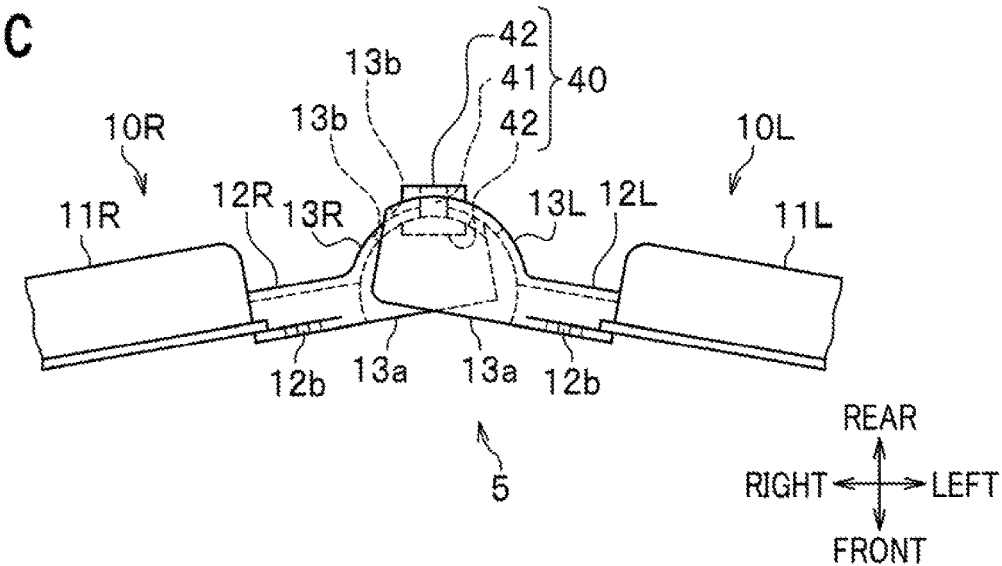
FIG. 8C is a plan view showing how the upper-lower displacement portion allows forward-rearward displacement of the left frame rear part and the right frame rear part.

As shown in FIGS. 8A to 8C, using the link portion 40 as a vertical axis, the semispherical portion 13L and the semispherical portion 13R can turn about the vertical axis at the upper-lower displacement portion 5.

Specifically, the frame 2 can bend and deform using the upper-lower displacement portion 5 as a point of bend, with the frame portion 11L and the frame portion 11R moving relatively rearward and the upper-lower displacement portion 5 moving relatively forward (from FIG. 8B to FIG. 8A).

Also, the frame 2 can bend and deform using the upper-lower displacement portion 5 as a point of bend, with the frame portion 11L and the frame portion 11R moving relatively forward and the upper-lower displacement portion 5 moving relatively rearward (from FIG. 8B to FIG. 8C).

Note that the frame 2 can also bend and deform with only one of the frame portions 11L, 11R moving relatively forward or rearward.

<Allowance of Displacement of the Fin in the Front-Rear Direction>

As shown in FIGS. 9A to 9C, using the paired protruding portions 35b, 35b as a vertical axis, the hollow-cylindrical portion 34L and the spherical portion 35R can turn about the vertical axis at the fin joint part 6.

Specifically, the fin 3 can bend and deform using the fin joint part 6 as a point of bend, with the fin 31L and the fin 31R moving relatively rearward and the fin joint part 6 moving relatively forward (from FIG. 9B to FIG. 9A).

Also, the fin 3 can bend and deform using the fin joint part 6 as a point of bend, with the fin 31L and the fin 31R moving relatively forward and the fin joint part 6 moving relatively rearward (from FIG. 9B to FIG. 9C).

Note that the fin 3 can also bend and deform with only one of the fins 31L, 31R moving relatively forward or rearward.

The shutter grill 1 according to the embodiment of the present invention is a shutter grill provided for the air-intake openings 51 formed on the outer surface of the vehicle and includes the frame 2 which has the opening portions 11a, 12a and is fixed to a member forming the outer surface (the grill 50) and the fin 3 capable of opening and closing the opening portions 11a, 12a inside the frame 2. The shutter grill 1 is characterized in that the frame 2 includes the upper-lower displacement portion 5 which allows the frame 2 to be displaced in the upper-lower direction at the time of a vehicle collision.

Thus, at the time of a vehicle collision, the shutter grill 1 can favorably displace the frame 2 in the upper-lower direction following displacement of the member forming the outer surface (the grill 50).

Further, the shutter grill 1 is displaced following displacement of the member forming the outer surface of the frame 2 (the grill 50), and therefore can reduce a reaction force to the collision load applied to an object involved in the collision with the vehicle (a collided object).

In addition, the shutter grill 1 is characterized in that the frame 2 includes the left frame 2L and the right frame 2R which are connected by the upper-lower displacement portion 5, that the left frame 2L and the right frame 2R are fixed to the member forming the outer surface (the grill 50), and that the upper-lower displacement portion 5 is a frame joint portion that allows the left frame 2L and the right frame 2R to be displaced in the upper-lower direction.

Thus, at the time of a vehicle collision, the shutter grill 1 can be favorably displaced in the upper-lower direction following displacement of the member forming the outer surface (the grill 50) by bending and deforming at the frame joint portion.

In addition, the shutter grill 1 is characterized in that the frame joint portion is a spherical joint and that a joint opening portion (the opening portion 13a, 13a) is formed on the front side of the spherical joint.

Thus, the shutter grill 1 can achieve the frame joint portion with a simple configuration.

Moreover, the shutter grill 1 can create space in front of the spherical joint and improve maintainability of the spherical joint.

In addition, the shutter grill 1 is characterized in that the frame joint portion is a spherical joint, that the fin 3 includes the left fin 3L capable of opening and closing the opening portions 11a, 12a of the left frame 2L and the right fin 3R capable of opening and closing the opening portions 11a, 12a of the right frame 2R, that the left fin 3L and the right fin 3R are connected by the fin joint part 6 inside the spherical joint, and that the fin joint part 6 allows the left fin 3L and the right fin 3R to be displaced in the upper-lower direction and to turn together in opening and closing directions.

Thus, at the time of a vehicle collision, the shutter grill 1 can favorably displace the fin 3 in the upper-lower direction following displacement of the frame 2, and even after the fin 3 is displaced, the fin 3 can be favorably opened and closed by the single motor 4.

Moreover, when the joint opening portion (the opening portion 13a, 13a) is formed on the front side of the spherical joint, the shutter grill 1 can improve maintainability of the fin joint part 6 inside the spherical joint.

Although the embodiment of the present invention has been described above, the present invention is not limited to the above embodiment and can be appropriately modified without departing from the gist of the present invention. For example, the shutter grill 1 of the present invention may include a plurality of fins 31L and a plurality of fins 31R arranged vertically. Further, the left fin 3L and the right fin 3R may be unconnected and configured to turn as driven by their respective separate motors 4. In this case, opening and closing of the left fin 3L and the right fin 3R are controlled independently, the amount of air to let in can be changed in stages. Further, the upper-lower displacement portion 5 is not limited to a spherical joint, and may be a conventional joint mechanism, link mechanism, or the like. In addition, the fin joint part 6 may be a spherical joint, or may be a conventional joint mechanism, link mechanism, or the like.

What is claimed is:

1. A shutter grill provided for an air-intake opening formed on an outer surface of a vehicle, comprising:
   a frame that has an opening portion and is fixed to a member forming the outer surface; and
   a fin capable of opening and closing the opening portion inside the frame,
   wherein
   the frame includes an upper-lower displacement portion that allows the frame to be displaced in an upper-lower direction at a time of a vehicle collision,
   the frame has a left frame and a right frame which are connected by the upper-lower displacement portion,
   the left frame and the right frame are fixed to the member forming the outer surface,
   the upper-lower displacement portion is a frame joint portion that allows the left frame and the right frame to be displaced in the upper-lower direction,
   the frame is fitted around the air-intake opening.
   the frame joint portion is a spherical joint,
   the spherical joint is formed by semispherical portions having openings at front sides,
   the fin includes a left fin capable of opening and closing the opening portion of the left frame and a right fin capable of opening and closing the opening portion of the right frame, and
   the left fin and the right fin are connected by a fin joint portion inside the semispherical portions.

2. The shutter grill according to claim 1, wherein the fin joint portion allows the left fin and the right fin to be displaced in the upper-lower direction and to turn together in opening and closing directions.

\* \* \* \* \*